(12) United States Patent
Nieh et al.

(10) Patent No.: US 8,239,693 B2
(45) Date of Patent: Aug. 7, 2012

(54) BUILT-IN SYSTEM POWER MANAGEMENT CIRCUIT AND MOTHERBOARD WITH THEREOF

(75) Inventors: San-Wei Nieh, Jumg-Ho (TW); Yu-Tsung Kao, Jumg-Ho (TW); Tung-Jung Tsai, Jumg-Ho (TW)

(73) Assignee: MSI Corporation (Shenzhen) Co., Ltd., Shenzhen (CN)

( * ) Notice: Subject to any disclaimer, the term of this patent is extended or adjusted under 35 U.S.C. 154(b) by 920 days.

(21) Appl. No.: 12/186,765

(22) Filed: Aug. 6, 2008

(65) Prior Publication Data
US 2010/0037079 A1  Feb. 11, 2010

(51) Int. Cl.
 G06F 1/00 (2006.01)
 G01R 19/25 (2006.01)
(52) U.S. Cl. ........ 713/300; 713/310; 713/320; 713/321; 713/322; 713/323; 713/324; 713/330; 713/340
(58) Field of Classification Search .................. 713/300, 713/330, 320–324, 340
See application file for complete search history.

(56) References Cited

U.S. PATENT DOCUMENTS

| | | | |
|---|---|---|---|
| 6,870,384 B1* | 3/2005 | Ricca | 324/750.02 |
| 7,768,274 B2* | 8/2010 | Chen et al. | 324/713 |
| 2004/0027891 A1* | 2/2004 | Hartmann | 365/202 |
| 2008/0115001 A1* | 5/2008 | Schuette | 713/340 |
| 2008/0288791 A1* | 11/2008 | Tsai et al. | 713/300 |
| 2008/0303506 A1* | 12/2008 | Chen et al. | 324/72 |

* cited by examiner

Primary Examiner — M Elamin
(74) Attorney, Agent, or Firm — Apex Juris, pllc; Tracy M. Heims

(57) ABSTRACT

The invention has disclosed a system power management circuit comprising: a printed circuit board and a hardware monitor. The printed circuit board includes at least a first power connector, a second power connector, and more than one detection circuits disposed thereon; wherein the first power connector is used for electrically connecting a power supply, the second power connector is used for electrically connecting a power connector of a motherboard, inputs of the detection circuits are electrically connected to the first power connector, respectively. The hardware monitor is electrically connected to outputs of the detection circuits, and used for converting electrical signals outputted from the outputs of the detection circuits into corresponding digital signals, as well as for transmitting the digital signals to the motherboard via a two-wire bus, the two-wire bus is bi-directional, and may be an $I^2C$ or a SM bus.

15 Claims, 4 Drawing Sheets

US 8,239,693 B2

BUILT-IN SYSTEM POWER MANAGEMENT CIRCUIT AND MOTHERBOARD WITH THEREOF

FIELD OF THE INVENTION

The invention is related to a system power management circuit, and more particularly to one that may be externally connected to or internally built in motherboards, and used for measuring actual voltage, actual currents, and actual output power of the motherboards, the circuit uses a two-wire bus for transmission to the motherboards, and the two-wire bus is bi-directional.

BACKGROUND OF THE INVENTION

In the patent US2008/0018325 titled "Apparatus and Method for Measuring an Output Power of a Power Supply", a measuring apparatus comprised of a circuit board and a meter had been disclosed, which is used for measuring an output power of a power supply. The measuring apparatus disclosed in US2008/0018325 may be used for measuring a current, a voltage, and a power provided by the power supply to a motherboard, so as to instantly find out whether the actual requirements has been fulfilled by the power supply or not.

However, the measuring apparatus has the following disadvantages:
1. The circuit board still needs an additional meter for the measurement of voltage, currents, and power, which increases the overall size and measuring costs of the measuring apparatus.
2. In regard to each independent power source of the power supply (for example, 3V, 5V, and 12V), because each independent power source has to rely on two lead wires for connecting the circuit board to the meter. For instance, when three independent power sources including 3V, 5V, and 12V are used, six lead wires would be required for connection, which further complicates the connection of the lead wires.
3. The circuits between the circuit board, the meter, the power supply, and the motherboard can only be used for transmitting signals in one way, which is inconvenient to use.
4. The meter can only be used for collecting signals of voltage, currents, and power of the circuit board, and is not connected to the motherboard, thus cannot be used for collecting signals of the motherboard.

It is therefore tried by the inventor to develop a motherboard having a built-in system power management circuit to solve the problems existing in the measuring apparatus as described above.

SUMMARY OF THE INVENTION

A primary objective of the invention is to propose a system power management circuit, which is externally disposed between a power supply and a motherboard and used for measuring an actual current and an actual voltage provided by the power supply to the motherboard, wherein a two-wire bus is used for transmitting signals of the actual current and the actual voltage to the motherboard, said two-wire bus is bi-directional.

A further objective of the invention is to propose a motherboard having a built-in system power management circuit, wherein the built-in power management circuit may be used for measuring an actual current and an actual voltage provided by the power supply to the motherboard, and utilizes a two-wire bus to transmit signals of the actual current and the actual voltage to the motherboard, said two-wire bus is bi-directional.

To achieve the first objective described above, the invention has proposed a system power management circuit comprising: a printed circuit board at least including a first power connector, a second power connector, more than one detection circuits, and a hardware monitor disposed thereon; wherein the first power connector is used for electrically connecting a power supply, the second power connector is used for electrically connecting a power connector of a motherboard, inputs of the detection circuits are electrically connected to the first power connector, respectively, and the hardware monitor is electrically connected to outputs of the detection circuits, and used for converting electrical signals outputted from the outputs of the detection circuits into corresponding digital signals, as well as for transmitting the digital signals to the motherboard via a two-wire bus.

To achieve the second objective described above, the invention has proposed a motherboard having the built-in system power management circuit.

BRIEF DESCRIPTION OF THE DRAWINGS

The structure and the technical means adopted by the present invention to achieve the above and other objectives can be best understood by referring to the following detailed description of the preferred embodiments and the accompanying drawings, wherein.

DETAILED DESCRIPTION OF THE INVENTION

Figure 1:
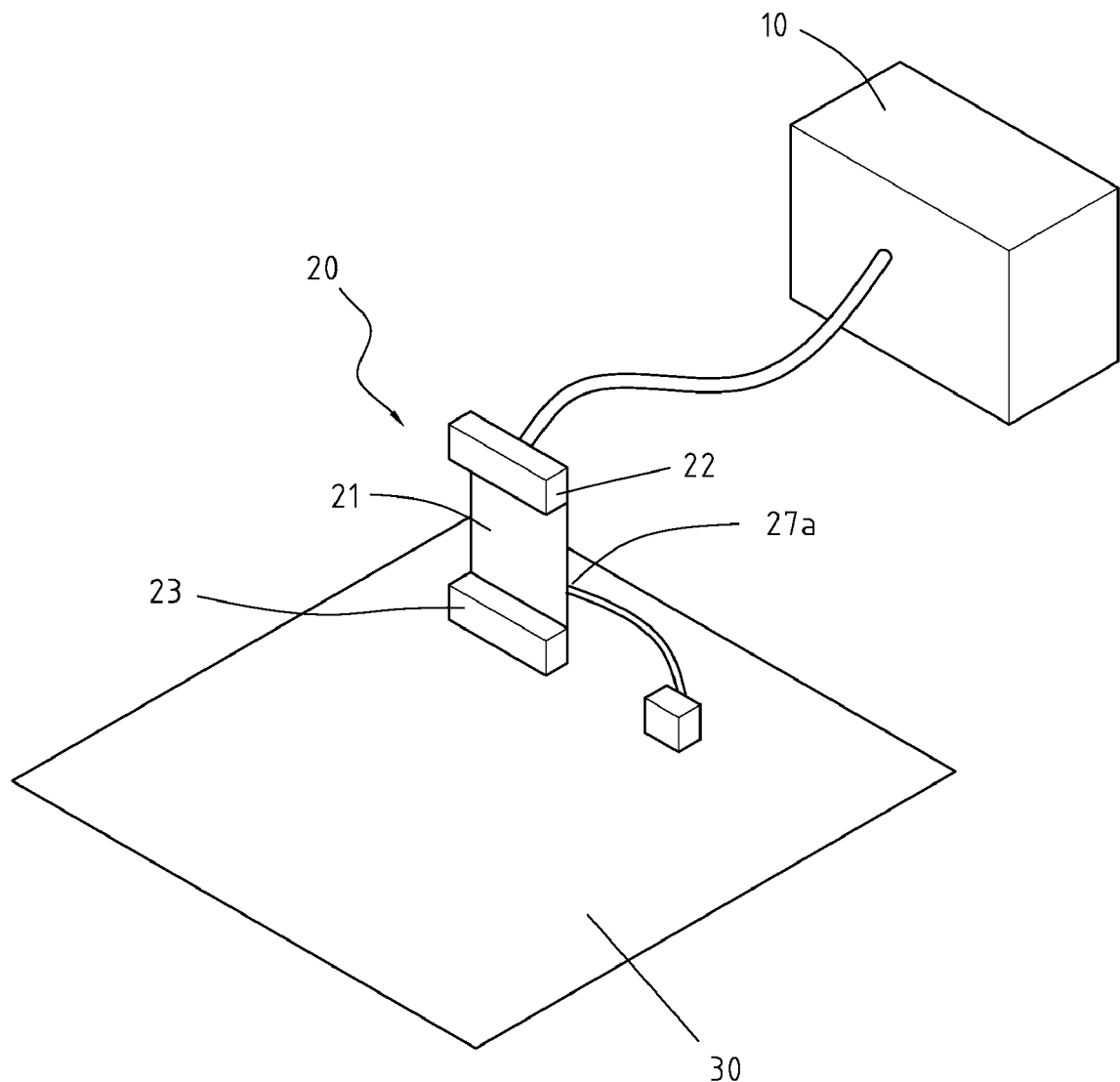
FIG. 1 is a schematic view that shows a system power management circuit being connected between a power supply and a motherboard according to the invention.
Figure 2:
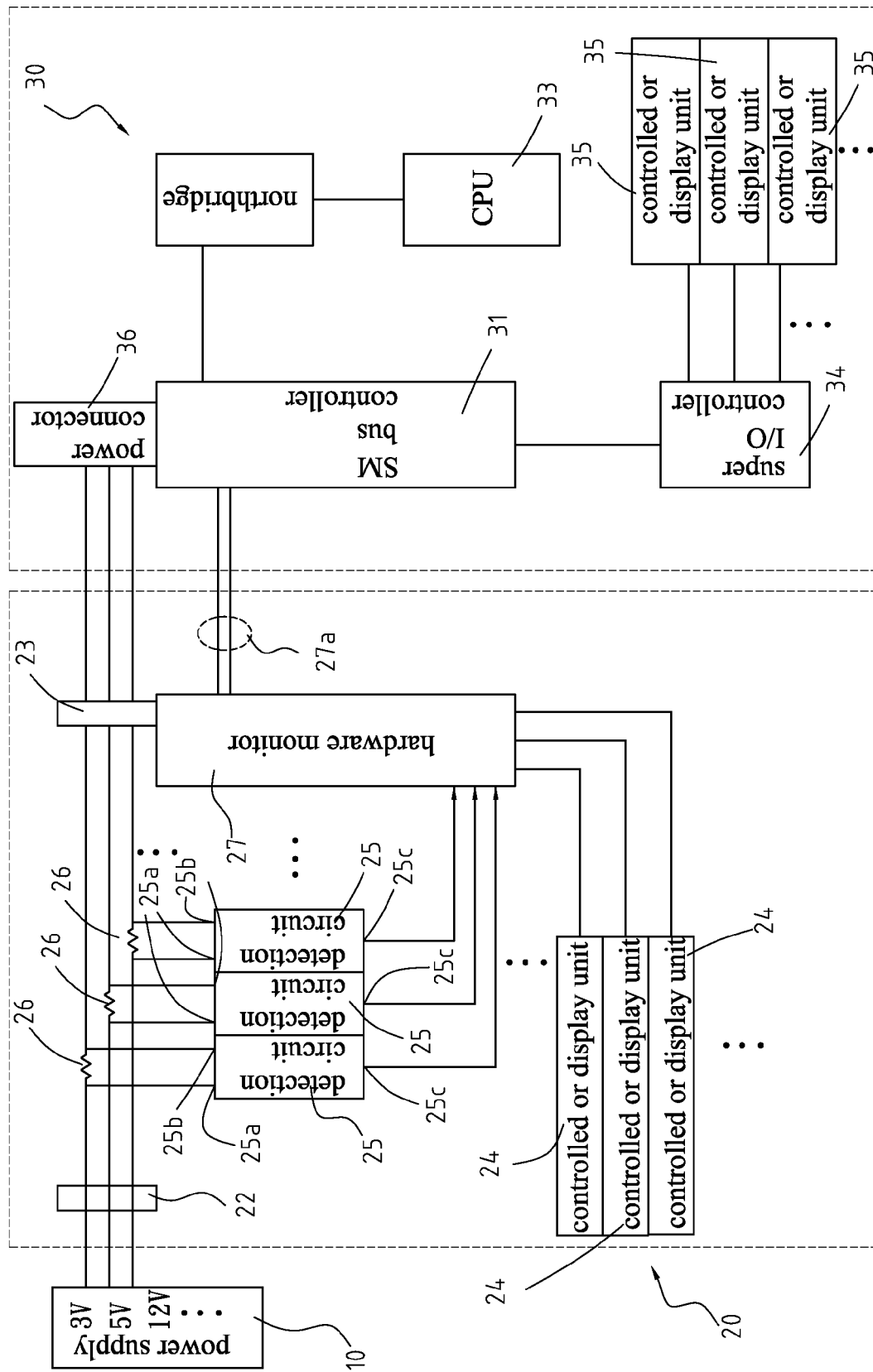
FIG. 2 is a schematic view that shows circuits of the system power management circuit.

FIG. 1 is a schematic view that shows a system power management circuit being connected between a power supply and a motherboard according to the invention, while FIG. 2 is a schematic view that shows circuits of the system power management circuit. According to the invention, a system power management circuit 20 may be manufactured as a small piece of circuit board, and may be plugged into a power connector 36 of a motherboard 30 by plugging and removing directly. The system power management circuit 20 comprises: a printed circuit board 21 and a hardware monitor 27. The printed circuit board 21 includes: a first power connector 22, a second power connector 23, more than one detection circuits 25, more than one resistance 26, and a hardware monitor 27 disposed thereon. The first power connector 22 is used for electrically connecting a power supply 10; the second power connector 23 is used for electrically connecting the power connector 36 of the motherboard 30. The hardware monitor 27 includes a two-wire bus 27a, which has signal terminals for electrically connecting connectors of a two-wire bus of the motherboard 30. The hardware monitor 27 may carry out two-way transmission to the motherboard 30 via transmission channels of the two-wire bus 27a, said two-wire bus is bi-directional and may be an I²C (Inter-integrated Circuit) or a SM bus (System Management bus).

The power supply 10 has a 3V voltage source, a 5V voltage source, and a 12V voltage source that are connected to corresponding terminals of the first power connector 22, a first input 25a of a corresponding detection circuit 25, and an end of the corresponding resistance 26, respectively. The corresponding detection circuit 25 also has a second input 25b connected to another end of the corresponding resistance 26, while corresponding terminals of the power connector 36 are also connected to another end of the corresponding resistance 26.

The detection circuit 25 is used to detect a voltage and a current at each detection point, and convert the voltage and the current into signals that may be received by the hardware monitor 27, and circuits found in embodiments of the invention may be that of the prior arts. A value of the resistance 26 may be designated as one that is far smaller then that of the motherboard 30.

Each said detection circuit 25 has an output 25c connected to a corresponding input of the hardware monitor 27. The hardware monitor 27 is soldered onto the printed circuit board 21, which is used for converting the electrical signals outputted from the output 25c of the detection circuit 25 into corresponding digital signals, and the electrical signals include signals of 3V actual voltage, signals of 3V actual currents, signals of 5V actual voltage, signals of 5V actual currents, signals of 12V actual voltage, and signals of 12V actual currents. In addition, the hardware monitor 27 may also be used for transmitting the digital signals to the motherboard 30 via the two-wire bus 27a. The hardware monitor 27 may be an implementation of the prior arts, such as a chip produced by Winbond™ Electronics Corp. with the model number W83L785R.

The aforesaid two-wire bus 27a may be an implementation of the prior arts, and is bi-directional. For example, the two-wire bus 27a may be an I$^2$C or a SM bus.

When the power supply 10 outputs a voltage of 3V, 5V, or 12V; because the value of the resistance 26 is known, and given the relationship between currents and voltage: I=V/R, a value of currents that flow through the resistance 26 may be calculated, and an output power may be derived subsequently according to the formula:

$$P = I \times V.$$

Moreover, the hardware monitor 27 has controlled or display units 24 connected thereto. The controlled or display units 24 can be at least used to show a measurement status of the 3V voltage source, a 5V voltage source, and a 12V voltage source. The controlled or display units 24 may comprise components like single LED, OLED displays, negative-ion generators, and audio output units.

The motherboard 30 includes a SM bus controller 31 for receiving SM bus digital signals transmitted by the hardware monitor 27, and the SM bus digital signals at least include: SM bus digital signals representing actual voltage of 3V, 5V, and 12V, as well as actual currents of 3V, 5V, and 12V. A CPU 33 is allowed to read the SM bus digital signals by executing programmable codes (for instance, BIOS, driver programs, or applications). Subsequently, the execution of the programmable codes allows parameters of the motherboard 30 to be displayed on a screen; the parameters includes signals of 3V actual voltage, signals of 3V actual currents, signals of 5V actual voltage, signals of 5V actual currents, signals of 12V actual voltage, signals of 12V actual currents, and output power of the different voltage. Alternatively, a super I/O controller 34 may be used to output monitoring status on controlled or display units 35.

The controlled or display units 35 are at least used to display measurement status of 3V voltage source, a 5V voltage source, and a 12V voltage source. The controlled or display units 35 may comprise components like single LED, OLED displays, negative-ion generators, audio output units, CPU fans, and speed controls of system fans.

Figure 3:
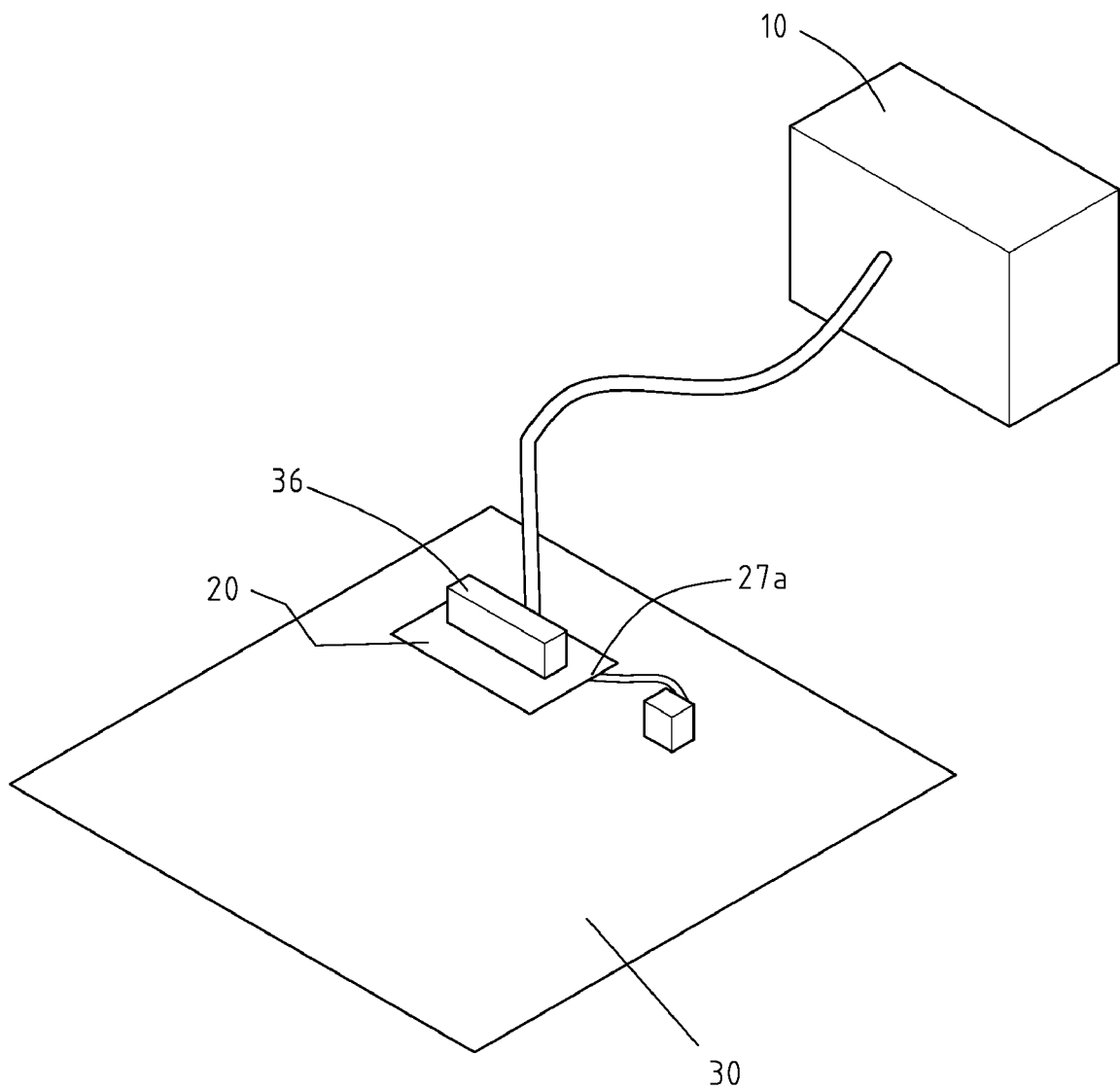
FIG. 3 is a schematic view that shows a motherboard having a built-in system power management circuit being connected to a power supply according to the invention.
Figure 4:
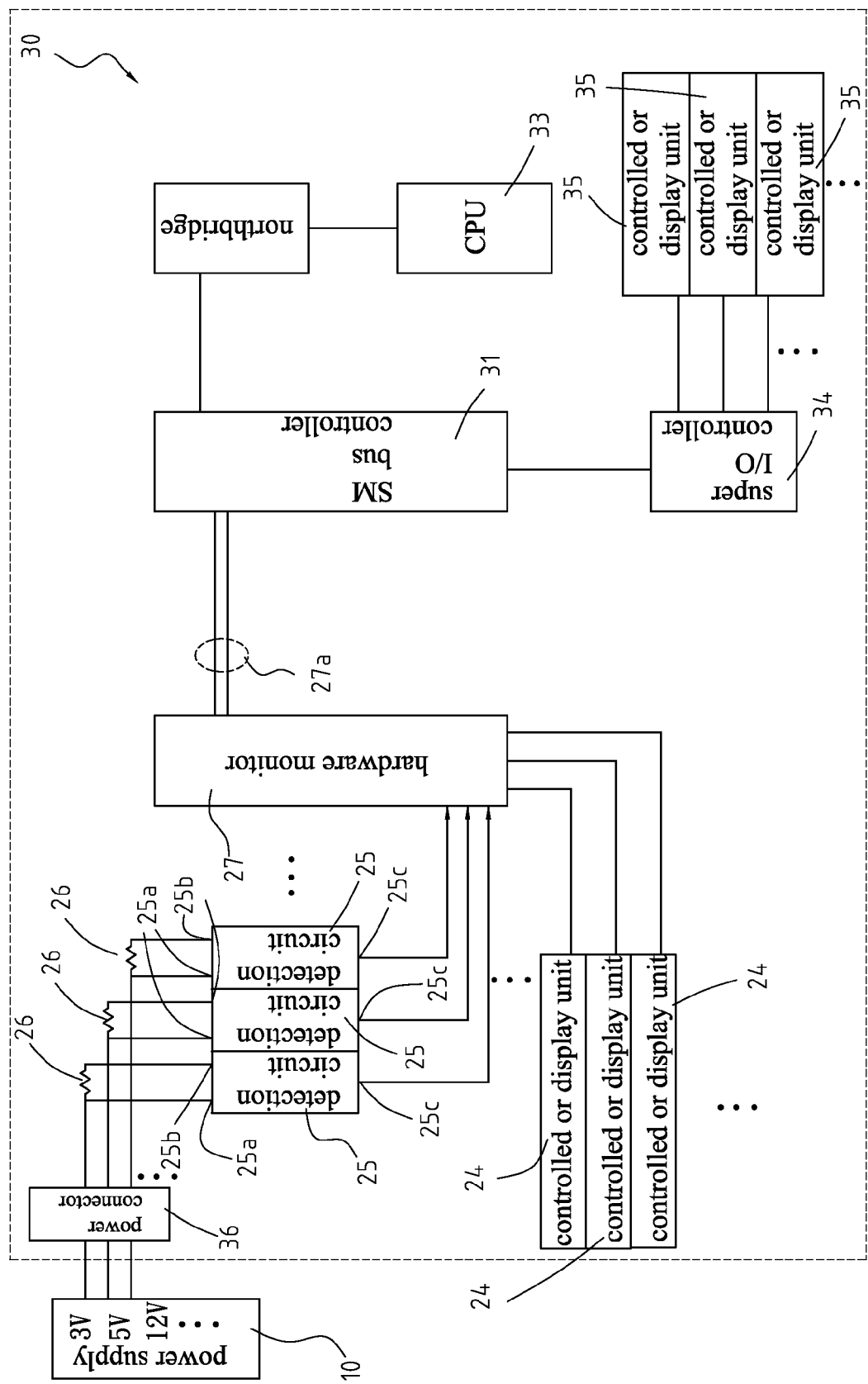
FIG. 4 is a schematic view that shows circuits of the motherboard having a built-in system power management circuit.

FIG. 3 is a schematic view that shows a motherboard having a built-in system power management circuit being connected to a power supply according to the invention, whereas FIG. 4 is a schematic view that shows circuits of the motherboard having a built-in system power management circuit. In this embodiment, the external system power management circuit shown in FIG. 2 is directly built in the motherboard 30, and the power connector 36 of the motherboard 30 is electrically connected to the power supply 10, the motherboard 30, and the built-in system power management circuit 20. Because the system power management circuit is built in the motherboard, the printed circuit board 21, the first power connector 22, and the second power connector 23 may be omitted.

The power supply 10 is electrically connected to the power connector 36 directly, and the hardware monitor 27 has a two-wire bus 27a, wherein signal terminals of the two-wire bus 27a are electrically connected to the motherboard 30.

The disclosure has the following advantages and effects:
1. According to the disclosure, the circuit board and the motherboard having a built-in system power management circuit do not need to be used in combination with a meter, which effectively reduces overall physical size and measurement costs.
2. The circuit board of the disclosure is connected to the motherboard via a two-wire bus; the two-wire bus is bi-directional and may be an I$^2$C or a SM bus, which significantly reduces quantities of lead wires, consequently decreases manufacturing costs and complexity of connecting the lead wires.
3. The circuit board of the disclosure is connected to the motherboard via a two-wire bus; the two-wire bus is bi-directional and may be an I$^2$C or a SM bus, which solves the problem of one-way signal transmission of the prior arts, such that signals may be transmitted in two ways, and further facilitates bi-directional control of communication between the circuit board and the motherboard.
4. The disclosure may be readily employed in combination with any motherboards, which adds further values to the motherboards.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A system power management circuit, comprising:
    a printed circuit board, at least including:
        a first power connector being fixingly disposed on the printed circuit board, for electrically connecting a power supply;
        a second power connector being fixingly disposed on the printed circuit board, for electrically connecting a power connector of a motherboard;
        at least more than one detection circuits being disposed on the printed circuit board, inputs of the detection circuits are electrically connected to the first power connector, respectively;
        a hardware monitor being fixingly disposed on the printed circuit board and electrically connected to between outputs of the detection circuits and the motherboard, and used for converting electrical signals outputted from the outputs of the detection circuits into corresponding digital signals, as well as for transmitting the digital signals to the motherboard via a two-wire bus.

2. The system power management circuit of claim 1, further comprising:
at least more than one display units, which are electrically connected to the hardware monitor.

3. The system power management circuit of claim 1, further comprising:
at least more than one controlled units, which are electrically connected to the hardware monitor.

4. The system power management circuit of claim 1, further comprising:
at least more than one resistance, wherein two ends of each said resistance are respectively connected to a first input and a second input of a corresponding detection circuit, in which said resistance are disposed on the printed circuit board.

5. The system power management circuit of claim 1, wherein the two-wire bus may be a SM bus (System Management bus) or an I2C (Inter-Integrated Circuit).

6. The system power management circuit of claim 1, wherein the digital signals including:
digital signals of 3V actual voltage, digital signals of 5V actual voltage, digital signals of 12V actual voltage, digital signals of 3V actual currents, digital signals of 5V actual currents, and digital signals of 12V actual currents.

7. The system power management circuit of claim 1, wherein the two-wire bus is bi-directional.

8. A motherboard having a built-in system power management circuit, comprising:
a motherboard;
at least more than one detection circuits being disposed on a printed circuit board, inputs of the detection circuits are electrically connected to a power connector of the motherboard, respectively;
a hardware monitor being fixingly disposed on the motherboard and electrically connected to between outputs of the detection circuits and the motherboard, and used for converting electrical signals outputted from the outputs of the detection circuits into corresponding digital signals, as well as for transmitting the digital signals to a corresponding chip on the motherboard via a two-wire bus.

9. The motherboard having a built-in system power management circuit of claim 8, further comprising:
at least more than one display units, which are electrically connected to the hardware monitor.

10. The motherboard having a built-in system power management circuit of claim 8, further comprising:
at least more than one controlled units, which are electrically connected to the hardware monitor.

11. The motherboard having a built-in system power management circuit of claim 8, further comprising: at least more than one resistance, wherein two ends of each said resistance are respectively connected to a first input and a second input of a corresponding detection circuit, in which said resistance are disposed on the motherboard.

12. The motherboard having a built-in system power management circuit of claim 8, wherein the two-wire bus may be a SM bus (System Management bus) or an I2C (Inter-Integrated Circuit).

13. The motherboard having a built-in system power management circuit of claim 8, wherein the corresponding chip on the motherboard may be a SM bus controller.

14. The motherboard having a built-in system power management circuit of claim 8, wherein the digital signals including:
digital signals of 3V actual voltage, digital signals of 5V actual voltage, digital signals of 12V actual voltage, digital signals of 3V actual currents, digital signals of 5V actual currents, and digital signals of 12V actual currents.

15. The motherboard having a built-in system power management circuit of claim 8, wherein the two-wire bus is bi-directional.

* * * * *

UNITED STATES PATENT AND TRADEMARK OFFICE
CERTIFICATE OF CORRECTION

| | | |
|---|---|---|
| PATENT NO. | : 8,239,693 B2 | Page 1 of 1 |
| APPLICATION NO. | : 12/186765 | |
| DATED | : August 7, 2012 | |
| INVENTOR(S) | : San-Wei Nieh, Yu Tsung Kao and Tung-Jung Tsai | |

It is certified that error appears in the above-identified patent and that said Letters Patent is hereby corrected as shown below:

Title Page: Item 73

In the original Patent the Assignee name was listed as MSI Corporation (Shenzhen) Co., The correct name of the Assignee should be:

MSI Computer (Shenzhen) Co., Ltd.

Signed and Sealed this
Eighteenth Day of December, 2012

David J. Kappos
*Director of the United States Patent and Trademark Office*